Sept. 1, 1925.

F. C. MOSIER 1,552,076

DRINKING FOUNTAIN

Filed April 14, 1925

Inventor
Frank C. Mosier

Attorney

Patented Sept. 1, 1925.

1,552,076

UNITED STATES PATENT OFFICE.

FRANK C. MOSIER, OF PITTSTON, PENNSYLVANIA.

DRINKING FOUNTAIN.

Application filed April 14, 1925. Serial No. 23,045.

*To all whom it may concern:*

Be it known that I, FRANK C. MOSIER, a citizen of the United States, and resident of Pittston, in the county of Luzerne and State of Pennsylvania, have invented certain new and useful Improvements in Drinking Fountains, of which the following is a specification.

My present invention relates to a drinking receptacle for fowls or barnyard animals.

The principal object of the invention is the provision of such a receptacle which may be readily thawed out in winter or freezing weather, and which at the same time may be utilized during the summer months.

To this end my invention includes two pans, each adapted to contain drinking water, and each provided with a central tubular projection adapted to telescopically engage each other so that the two pans lie in spaced relation to each other.

The invention further consists in the combination, arrangement and construction of parts hereinafter shown and described.

I have illustrated in the accompanying drawing one form of the invention, although obviously I do not wish to be limited to this exact structure, as it merely illustrates the principle involved.

In the drawings:—

Figure 1:
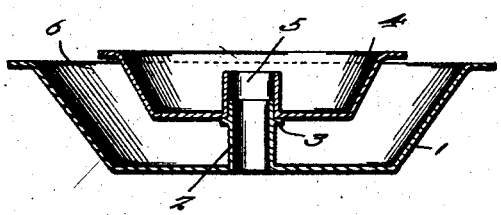
Figure 1 is a composite sectional elevation of one form of my invention.
Figure 2:
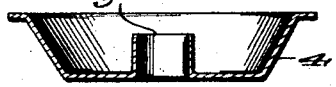
Fig. 2 is a sectional elevation of a detail.

Referring now with particularity to the invention, I have illustrated a pan or the like at 1 having a dished interior, the bottom thereof being provided with a tubular upstanding member 2 soldered or otherwise secured to the center of the pan 1. Intermediate the top and bottom of the part 2 I provide an annular band or ridge 3 for a purpose to be more fully described hereinafter.

Another pan 4, smaller in diameter than the pan 1, is provided with a tubular element 5 projecting upwardly from the bottom thereof surrounding an axial aperture in the bottom of the pan. The interior diameter of the element 4 is slightly larger than the smaller exterior diameter of the member 2.

With the structure as above described, the pan 4 may be superimposed on the pan 1 so that the tubular element 5 of the former telescopically engages the tubular element 2 of the latter, and the bottom of the pan 4 rests upon and is supported by the ridge or band 3.

In such position it will be apparent that water may be placed in the pan 4, which if left in freezing weather, may be readily thawed out by introducing hot or warm water into the space 6 between the pans 1 and 4. The ice having become loosened in the pan 4 by reason of the heat transfer, it may be readily removed and re-filled with fresh water.

In the summer time it will be apparent that the pan 4 may be removed from its position on the tubular element 2 so that the pans 1 and 4 may each be used as an individual drinking receptacle.

It will be obvious that the two pans may be made of any desired shape, it only being necessary that there be sufficient space between the wall of the pan 4 and the pan 1 to allow hot water to be introduced therebetween. For this purpose, where the walls of the two pans are very close together, a funnel may be made use of, of any desired construction.

Having thus described my invention, what I claim is:—

1. A drinking fountain comprising a pan having a central tubular projection upstanding from the bottom thereof, a peripherial ridge thereon, a second pan of smaller diameter than the first having an axial aperture therethrough, the tubular projection of the first mentioned pan entering the aperture in the second mentioned pan, the bottom of the latter resting upon the ridge on the tubular element of the first mentioned pan.

2. A drinking fountain comprising a pan having a tubular element upstanding from the bottom thereof, a second pan concentric with the first and having a flat bottom, the smaller pan being provided with an axial aperture in its bottom telescopically engaged by the tubular element on the first mentioned pan and supported thereon.

In testimony whereof I affix my signature.

FRANK C. MOSIER.